US005560970A

United States Patent [19]

Ludebühl

[11] Patent Number: 5,560,970

[45] Date of Patent: Oct. 1, 1996

[54] DISPLAY MARKING TAG, SUCH AS A DISPLAY MARKING TAG HAVING AN ADHESIVE FASTENING STRIP

[75] Inventor: Dieter Ludebühl, Rothenberg, Germany

[73] Assignee: Esselte Meto International GmbH, Heppenheim, Germany

[21] Appl. No.: 275,284

[22] Filed: Jul. 14, 1994

[30] Foreign Application Priority Data

Jul. 16, 1993 [DE] Germany .......................... 43 23 883.1

[51] Int. Cl.$^{6}$ ............................... B32B 3/00; G08B 13/18

[52] U.S. Cl. ............................ 428/41.9; 40/299; 40/669; 40/694; 40/902; 340/570; 428/192; 428/195; 428/201; 428/202; 428/203; 428/204; 428/211; 156/272.4; 156/273.9; 156/290; 156/300

[58] Field of Search ............................. 428/40, 192, 195, 428/901, 201, 202, 203, 204, 211; 340/572; 40/299, 669, 594, 902; 156/300, 272.4, 273.9, 290

[56] References Cited

U.S. PATENT DOCUMENTS

| | | | |
|---|---|---|---|
| 3,500,373 | 3/1970 | Minasy | 340/258 |
| 4,158,434 | 6/1979 | Peterson | 340/72 |
| 4,751,500 | 6/1988 | Minasy | 340/572 |
| 5,182,544 | 1/1993 | Aquilera | 340/572 |
| 5,285,191 | 2/1994 | Reeb | 428/901 |

FOREIGN PATENT DOCUMENTS

| | | |
|---|---|---|
| 0096182 | 12/1983 | European Pat. Off. . |
| 0112493 | 7/1984 | European Pat. Off. . |
| 0122326 | 10/1984 | European Pat. Off. . |
| 0123557 | 10/1984 | European Pat. Off. . |
| 6605018 | 11/1967 | Germany . |
| 2221493 | 11/1972 | Germany . |
| 3446412 | 6/1986 | Germany . |
| 3506445 | 8/1986 | Germany . |
| 4034720 | 7/1991 | Germany . |
| 9111410 | 1/1992 | Germany . |
| 9210781 | 12/1992 | Germany . |
| 7223394 | 1/1994 | Germany . |
| 4223394 | 1/1994 | Germany . |

*Primary Examiner*—Nasser Ahmad

*Attorney, Agent, or Firm*—Nils H. Ljungman and Associates

[57] ABSTRACT

A display marking tag for marking an item has an adhesive fastening strip for fastening the tag to the item to be marked, and a second strip, which can be adhered to the fastening strip, and which has a surface for being printed upon. On the side of the second strip disposed in contact with the fastening strip there can preferably be a semitransparent coating for decreasing the translucency of the second strip.

21 Claims, 5 Drawing Sheets

DISPLAY MARKING TAG, SUCH AS A DISPLAY MARKING TAG HAVING AN ADHESIVE FASTENING STRIP

BACKGROUND OF THE INVENTION

1. Field of the Invention

This invention generally relates to a display, or marking tag having an adhesive fastening strip for fastening the tag to an item. Such a display tag can generally be a price tag, or an information tag which is applied to a product in a retail outlet store, and which can have a backing strip coated with adhesive for attaching the tag to an item. The adhesive coating can be covered by a silicone coated backing strip to protect the adhesive from adhering to undesired articles. This silicone coated strip is removable due to the silicone coating, so that the adhesive side of the tag can be exposed for attaching the tag to a desired item. Such a tag could also include an anti-theft tag having a backing film or carrier foil for a security element and a recording medium glued to the security element.

2. Background Information

Display tags having the basic components as outlined above are generally known. In the most common form of tag, the laminated material, which exerts the adhesive effect generally has a layer of adhesive deposited on a printable recording medium, such as paper. Laminated materials having two layers of adhesive, a first layer in contact with the recording medium, and a second adhesive layer facing the removable carrier strip, wherein the second layer has a stronger adhesive characteristic, have been used to form such adhesive tags. Generally, the two layers of adhesive can be provided on opposite sides of an additional strip, which strip can then be adhered to the recording medium.

With a tag having the general laminated type of construction as discussed above, security elements have been disposed between the two layers forming the tag to form anti-theft tags. One such type of anti-theft tag of the type described above is disclosed by the German Published Application DE 42 23 394 A1. As disclosed thereby, such an tag can contain a magnetically soft, or weak, metal strip, which can serve as an active security element. Then, if the tag is carried through a security area bordered by a some sort of detection device, an alarm can be activated by the detection device indicating an unauthorized removal of the item from a protected area. In general, the security area can be bordered by a transmitter antenna and a receiver antenna, and the security element, such as when the tag is attached to an article to be protected against theft, can then be radiated by the transmitter antenna with a generated alternating electromagnetic field, so that the magnetically soft metal strip is remagnetized at the frequency of this field. Consequently, the tag can then emit an alternating electromagnetic field of its own, which can be received by the receiver antenna and trigger a theft alarm. Such tags can also be deactivated by a salesperson so that the alarm is not triggered.

Conventional tags of the type described above, can have a recording medium which is made of conventional or temperature-sensitive paper, which is generally translucent, or at least partly transparent. As such, the security element, i.e. the metal strip, which is located under the recording medium, can be readily visible. A potential shoplifter can thus easily identify this tag as an anti-theft tag, and may then either decide not to steal the article with the anti-theft tag and possibly instead select an article without such a tag, or possibly even remove the tag from the article before attempting to carry the article out of the store. In none of the above cases does the tag perform the function for which it was designed, namely to protect the merchandise in a store against theft.

OBJECT OF THE INVENTION

The object of the present invention is therefore to create a tag which is not readily visible or identifiable, for example, as an anti-theft tag, and which tag in all respects, essentially looks like a conventional paper tag and therefore will not be readily detectable by a potential shoplifter.

SUMMARY OF THE INVENTION

The present invention teaches that this object can be achieved by preferably providing the recording medium, on the side facing the security element, with a coating which has a low transparency for light in the visible range, so that the security element will not be visible.

The basic teaching of at least one embodiment of the present invention is to provide the recording medium, on its side facing the security element, with a non-transparent coating, to prevent the customer from seeing the security element through the recording medium. Such a coating, in terms of its optical properties, should preferably be selected so that in the relevant wavelength range of visible light, there can be a sufficiently strong attenuation of light by absorption or reflection. The term "reflection", as used in the context of the teaching of the invention, should be considered to include a dispersion of the light in arbitrary or random directions, as caused, for example, by opaque coatings. By selecting the thickness and/or the type of material to be used for the coating, it thereby becomes possible to achieve a sufficiently low transmission through the recording medium—which need not necessarily be zero—to prevent the optical detection of the security element.

The advantage of the present invention resides primarily in the fact that potential shoplifters, in particular, are given essentially no indication that the tag in question is an anti-theft tag. Therefore it may never occur to them to remove the tag before attempting to steal an article from the store. The attempted theft can then be detected by control devices located at the exit from the store. The anti-theft tag in accordance with the present invention is also economical to manufacture, since only a relatively thin additional coating needs to be applied during the manufacturing of the tag.

The low-transparency coating can, for example, in at least one embodiment of the present invention, be an opaque coat of paint or ink applied to the back side of the recording medium. Such a coating can be manufactured economically and easily, and not only can cause a dispersion of light by reflection, but also can absorb a significant portion of the light.

It can also be particularly advantageous to provide the backing film with a low-transparency coating. With such a low-transparency coating also on the backing film, the tags could then also be used to label transparent articles wherein the security element would not be detectable from either side of the tag. The tags would then still be undetectable as anti-theft tags.

It can also turn out to be advantageous to detachably attach the side of the backing film of the anti-theft tag, that is, the side opposite to the security element, to a removable backing by means of an adhesive. This configuration can facilitate the printing, transport and storage of the tags (as well as any additional manufacturing steps which may be necessary). The removable backing can then be removed during the tagging of the article in question, preferably by means of a manual tagging or a dispensing device.

In one embodiment of the invention, the security element can be a continuous, narrow strip of magnetically soft material disposed along the recording medium. If an item tagged with an activated anti-theft tag is carried through a security gate which includes transmitter and receiver antennas, and if the tag thereby encounters an alternating electromagnetic field, the magnetically soft metal strip can preferably be remagnetized at the frequency of the alternating field. Consequently, the metal strip can then emit an alternating electromagnetic field of its own, which emitted field can be received by the receiver antenna. After evaluating the signal received, a theft alarm can then be activated, if appropriate.

To deactivate the tag, so that a purchaser of an item can carry the purchased item through the doorway of the store, the metal strip can preferably be placed in a permanently magnetized state. To enable such a permanently magnetized state to be induced, the strip can preferably be covered with additional pieces of magnetically hard metal, preferably positioned at spaced apart intervals from one another. When the merchandise tagged with the anti-theft tag is paid for, the tag can then preferably be deactivated by exposing the tag to a constant magnetic filed which is strong enough to magnetize the pieces of magnetically hard metal. Thus, on account of the magnetic characteristics of the magnetized hard metal, the pieces of magnetically hard metal retain this magnetization, even after the constant magnetic field has been shut off. The magnetized pieces of magnetically hard metal force the soft magnetic metal strip into magnetic saturation, so that the soft metal strip can no longer be remagnetized by an external alternating magnetic field. Thus the anti-theft tag will generally no longer react to the detection apparatus when it is carried through the security gate, and can thus generally no longer set off the theft alarm.

Another disadvantage of the known anti-theft tags is that the pieces of metal strip cause bulges in the tag, which can not only be seen, but can also be felt. Thus, in accordance with an alternative embodiment of the present invention, it can preferably be advantageous if the low-transparency coating and/or the coating applied to the backing film be made from a diamagnetic or paramagnetic metal. It has been found that a metal coating which covers the pieces of metal can typically be sufficiently stiff to eliminate such bulges in the tag, so that a shoplifter, even upon feeling a tag, is given essentially no indication that it is an anti-theft tag. The flat surface of the recording medium which results from a metal coating as opposed to a piece of metal, has the additional advantage that the tag can be printed cleanly, that is, without the contrast between the ink on the raised portions of the recording medium being darker than the ink printed on the recessed portions immediately adjacent such a bulge. The result is preferably a smooth image. A bulge in the recording medium would mean that during the printing of the recording medium, individual elements of the print head would come into contact with the raised portion of the bulge, and would produce a printed image with sharp contours at those points, while the elements of the print head would hardly come into any contact with the areas of the recording medium on both sides of the bulge, and thus would leave behind only weak markings, or no markings at all.

If metal coatings of low transparency are used, it would typically be necessary for the metal to be diamagnetic or paramagnetic, because such materials can only be weakly magnetized, so that no false alarms will be triggered when the tag passes through the security area.

It has been found that aluminum can be used as the metal coating, as aluminum coatings can impart the required stiffness to the recording medium. Further, aluminum coatings can, in essence, only be very weakly magnetized, thereby essentially not interfering with the function of the tag, and remain relatively economical.

A magnetically soft thin film coating applied to the backing film could also be used as the security element. In this case, the low-transparency coating need not be in the form of a metal coating, since the thin film coating on the tag does not produce any bulges like those produced by the narrow metal strips, and which would most likely reveal that the tag is an anti-theft tag. This is particularly true if the magnetically hard metal strips required for the deactivation of the tag are replaced by a magnetically hard metal film, e.g. a film which can preferably be nickel.

Resonant circuits can also be used as alternatives to magnetic security elements, that is, when the resonant circuits are realized in the form of thin-film integrated circuits which can be bombarded with electromagnetic waves at the exit from the store, to produce a detectable signal. The waves received and re-emitted by the tags are received by means of suitable antennas, and activate an alarm. In this configuration, the low-transparency coating can obviously also be made of non-conducting and thus non-shielding material.

If the recording medium is made of a material similar to cardboard, it becomes even more difficult to detect the fact that the tag is an anti-theft tag. Such tags, on account of their stiffness, are particularly suited for use on textiles, etc., when attached by means of plastic threads.

In summary, one feature of the invention resides broadly in a method of marking an item by means of a display marking tag configured to be adhesively attached to the item. The method comprises the steps of: providing a marking tag by way of the following steps: providing a first sheet of material, the first sheet of material having a first side, and a second side disposed opposite to the first side; configuring a first adhesive for the first side of the first sheet of material, the configuring comprising configuring the first adhesive to have a degree of adhesion for adhering the marking tag to an item; providing the first adhesive on at least a portion of the first side of the first sheet of material; providing a removable backing strip having a coating with minimal adhesion to at least the first adhesive to maintain the removable backing strip in contact with the first sheet of material prior to attaching the tag to an item, and enable the backing strip to be removed from the first sheet of material for application of the tag to an item; applying the removable backing strip to the first side of the first sheet of material; providing a second sheet of material, the second sheet of material having a translucency to visible light, and the second sheet of material comprising: a first side, the first side of the second sheet of material having an area for display of information thereon; and a second side, the second side of the second sheet of material for being disposed towards the first sheet of material; providing the second side of the second sheet of material with a layer substantially opaque to visible light to decrease the translucency of the second sheet of material to visible light; configuring a second adhesive for the second side of the first sheet of material to adhere the first sheet of material to the second sheet of material, the configuring comprising configuring the second adhesive to provide a substantially stronger degree of adhesion between the first sheet of material and the second sheet of material than the degree of adhesion provided by the first adhesive between the first sheet of material and an item to which the tag is to be attached; providing the second adhesive on at least a portion of the second side of the first sheet of material; providing a device for being sensed and disposing the device for being sensed between the first and second sheets of material; and permanently attaching the second sheet of material to the first sheet of material via the second adhesive. The method further comprises the steps of: removing the removable backing from the first adhesive on the first side of the first sheet of material of the marking tag; and marking an item by attaching the first side of the first sheet of material to the item to be marked with the first side of the second sheet of material disposed away from the item and the device for being sensed visibly concealed between the item and the second sheet of material.

Another aspect of the invention resides broadly in a display marking tag for marking an item to which the tag will be attached. The tag comprises: a first sheet of material, the first sheet of material having a first side, and a second side disposed opposite the first side; a first adhesive disposed on at least a portion of the first side of the first sheet of material, the first adhesive being configured for retaining the tag on the item to which the tag will be attached; a device for being sensed, the device for being sensed being disposed adjacent the second side of the first sheet of material; a second sheet of material, the second sheet of material having a translucency to visible light; a second adhesive disposed on at least a portion of the second side of the first sheet of material, the second adhesive being configured for having a greater degree of adhesion between the first sheet of material and the second sheet of material than a degree of adhesion provided by the first adhesive between the first sheet of material and an item to which the tag will be attached; and the second sheet of material comprising: a first side, the first side of the second sheet of material being configured for the display of information thereon; and a second side, the second side of the second sheet of material being disposed in at least partial contact with the second adhesive to retain the first sheet of material in at least partial contact with the second sheet of material and sandwich the device for being sensed between the first and second sheets of material, the second side comprising: at least a semitransparent layer for decreasing the translucency of the second sheet of material to visible light, and substantially conceal the device for being sensed from being visibly detected from the first side of the second sheet of material.

Another feature of the invention resides broadly in a display marking tag for being attached to an item, the tag comprising: a first sheet of material, the first sheet of material having a translucency to visible light, and the first sheet of material comprising: a first side, the first side comprising an area for display of information thereon; and a second side, the second side being opposite to the first side; apparatus for being attached to the item; a device for being sensed, the device for being sensed for being disposed at the second side of the first sheet of material; a configuration for maintaining the device for being sensed at the second side of the first sheet of material; and the second side of the first sheet of material comprising an at least semitransparent layer configured for decreasing the translucency of the first sheet of material to minimize visible detection of the device for being sensed through the first sheet of material from the first side of the first sheet of material.

BRIEF DESCRIPTION OF THE DRAWINGS

Embodiments of the present invention are described below in greater detail, with reference to the accompanying figures, in which.

DESCRIPTION OF THE PREFERRED EMBODIMENTS

Figure 1:
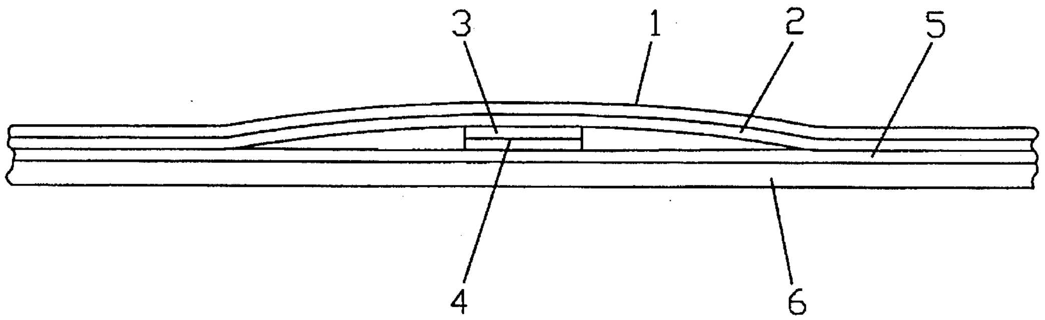
FIG. 1 shows, in cross section, a tag having a metal strip as a security element.

As shown in FIG. 1, one embodiment of a tag in accordance with the present invention is an anti-theft tag which has a backing film 2 for a continuous, magnetically soft metal strip 4, and a recording medium 6 glued to the metal strip. So that the anti-theft tag is not recognizable as such and looks like a conventional paper tag, the recording medium 6 can be provided with a low-transparency coating 5 on the side facing the metal strip 4. It should be generally understood that such a coating 5 could be used for essentially any type of tag which is meant to cover over, or conceal, something, i.e., even an old price tag, for example.

The tag illustrated in cross section in FIG. 1 is depicted with a backing strip 1 which could possibly be made of conventional paper, such as paper having a weight of 67 $g/m^2$, but other materials, such as plastics, etc, could also be used. This backing strip 1 can preferably be coated with silicone on the side facing the other layers of the tag. It is generally known that silicone has the characteristic of relatively low adhesion to adhesives. In essence, other materials having low adhesion to adhesives could also be used as the coating for the strip 1.

On the tag according to at least one of the embodiment of the present invention, this low adhesion of the backing strip 1 preferably enables the backing strip 1 to be easily removed from a backing film 2, which backing film 2 can be an essentially permanent part of the tag. This backing film 2 can preferably be coated on both sides with an adhesive. In one embodiment, such as possibly the embodiment illustrated in FIG. 1, the backing film 2 can preferably be in the form of a transparent polyester film and can be coated with aluminum (which can preferably be applied by metallizing or sputtering) on the side facing the security element, i.e., the metal strip 4.

In one possible mode of manufacture of the anti-theft tag, the backing film 2 can first be adhered onto the backing strip 1. The backing film 2 could then receive a coat of adhesive on the other side thereof. Then pieces 3 of magnetically hard metal can be adhered onto the other side of the backing film 2, at preferably substantially equal intervals from one another and preferably in a row. Over the metal pieces 3, a continuous, magnetically soft metal strip 4 can be fixed to the backing film 2 by the adhesive action of the adhesive located in the spaces between the pieces of metal 3. Such an arrangement of the pieces of metal 3 and of the metal strip 4 is shown particularly clearly in FIG. 2.

By means of the adhesive located on the underside of the backing film 2, the backing film 2 can then be glued to a recording medium 6. This recording medium 6 can be a temperature-sensitive paper, or alternately a conventional paper, which, in accordance with the present invention, can have a low-transparency coating 5 on the side thereof facing the backing film 2. In one embodiment of the invention, such as the tag illustrated in FIG. 2, the coating 5 could preferably be a grey, opaque layer of ink or paint.

Figure 2:
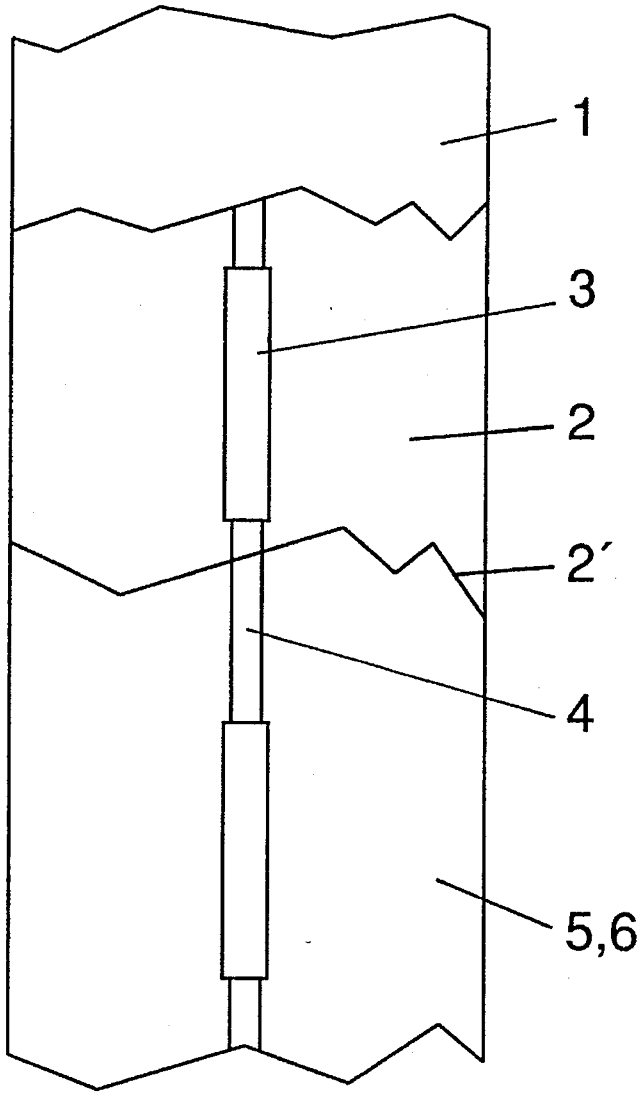
FIG. 2 shows a plan view, in partial cross section, of the tag of FIG. 1.

FIG. 2 is a plan view in partial cross section, which shows the individual layers of one embodiment of an anti-theft tag in accordance with the present invention. FIG. 2 shows the backing strip 1, the magnetically hard pieces of metal 3 located at intervals from one another, the magnetically soft metal strip 4 located underneath them, and the recording medium 6 coated with a coat of ink 5. The backing film 2, which can preferably be transparent polyester and is located between the pieces of metal 3 and the backing strip 1, is indicated only by means of a broken line 2'.

Figure 3A:
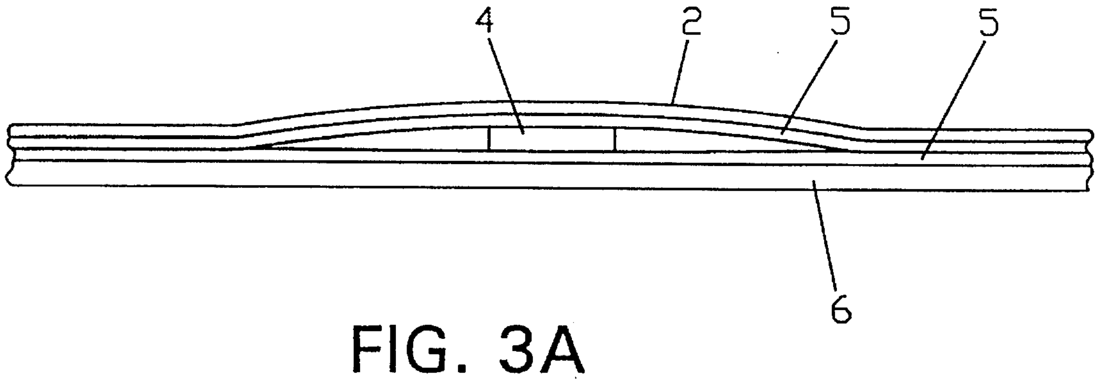
FIGS. 3A and 3B show simplified tag structures in accordance with the present invention.

As shown in FIG. 3A, simpler tags are conceivable for certain purposes, i.e. tags which may possibly only have a backing film 2, a metal strip 4 and a recording medium 6 glued to the backing film 2 or metal strip 4, which recording medium 6 can preferably have the low-transparency coating 5 on the side facing the metal strip 4. As also shown in this embodiment, the backing film 2 can also possibly have a low-transparency coating 5 disposed thereon, thereby making the tag opaque from both sides for use on transparent objects.

Figure 3B:
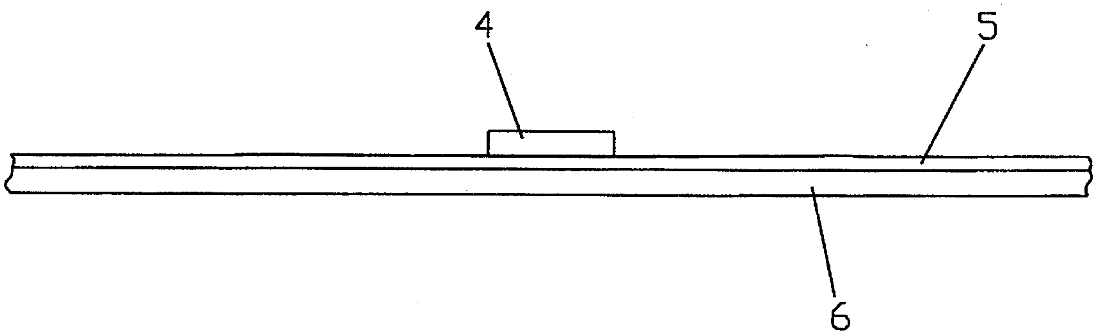

Alternately, as shown in FIG. 3B, an even simpler embodiment could be conceivable, wherein there is only a recording medium 6 with a surface coated with adhesive, to which surface is adhered a metal strip 4. The surface, before being coated with adhesive, could preferably be coated with the low-transparency coating 5. Alternatively, the embodiments of FIGS. 3A and 3B could also be provided with a backing strip 1 to simplify handling and transport, etc.

In essence, it is also conceivable that other types of security elements, other than a soft magnetic material 4 can be used with such a label configuration in accordance with the present invention. For example, while the recording medium 6 can be transparent to visible light, and the coating 5 can be opaque to visible light, it could be conceivable that a coating 5 can be provided which, in conjunction with the recording medium 6, are both transparent to a non-visible radiation, which might be ultra-violet radiation, infra-red radiation, etc. A security element could then possibly be configured which is able to reflect such radiation back to a receiver to trigger an alarm, or possibly react in some other manner to the penetrating radiation and thereby trigger an alarm. In such instances, since the layer 5 is opaque to visible light, the security element would still remain essentially visibly undetectable.

Figure 4B:
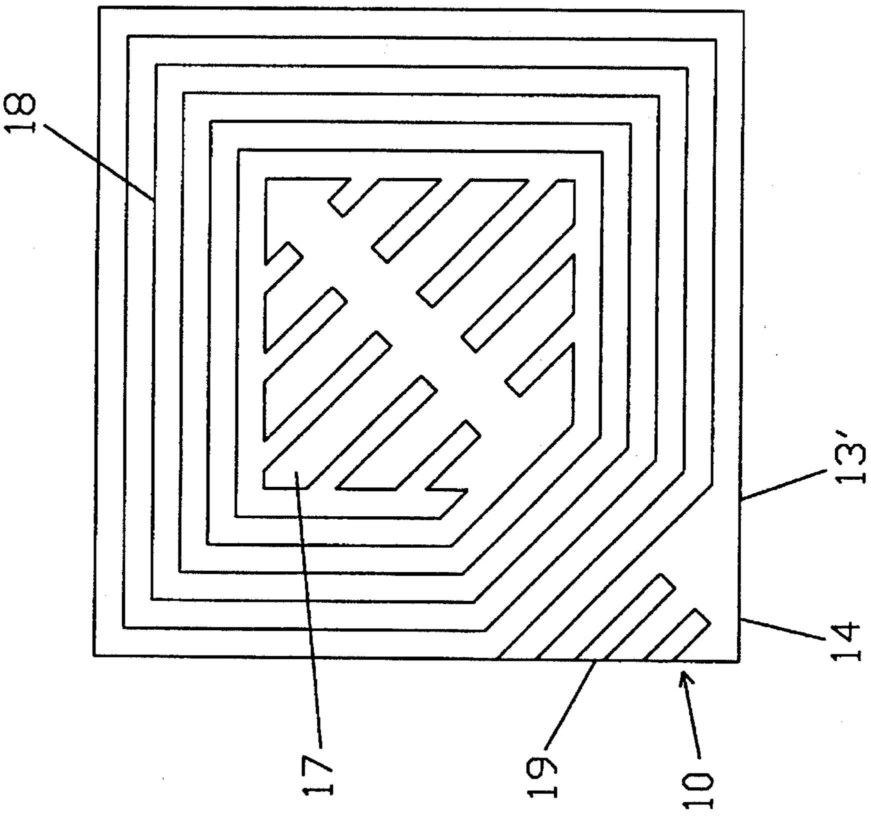
FIGS. 4A and 4B show a plan view of a tag having a resonance circuit as a security element.
Figure 4A:
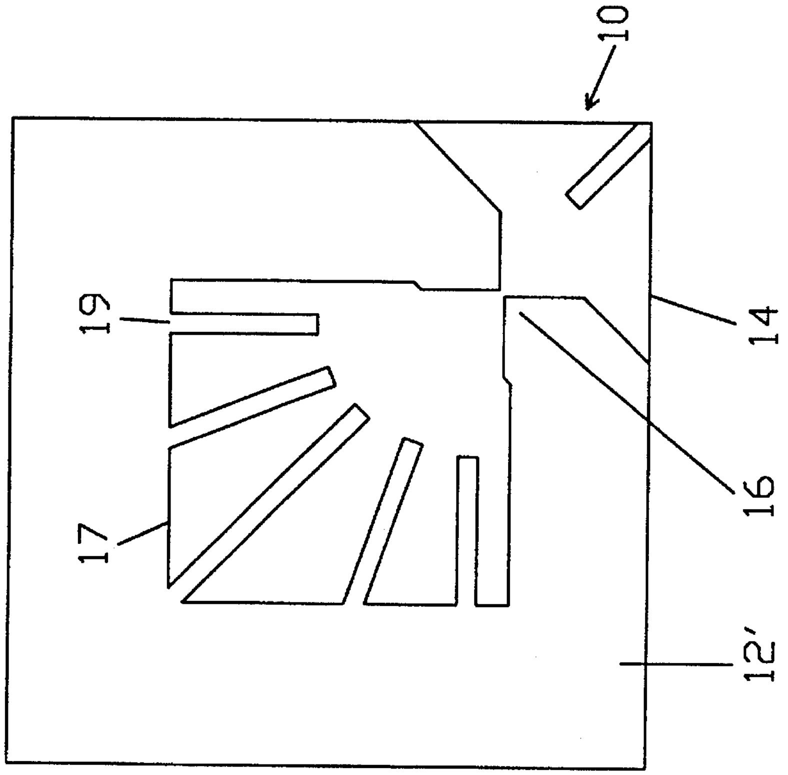

One other type of security element which could be used is what is commonly known as a resonant circuit. FIGS. 4A and 4B show a typical resonance structure 10 which can possibly be used in accordance with one additional embodiment of the present invention, with FIG. 4A showing one side of the tag, and FIG. 4B showing the other side. As shown in FIG. 4A, an etched pattern 12' is shown on a metallised side of the tag, and as shown in FIG. 4B, an etched pattern 13' is shown on the opposite (bulk metal) side of the tag. The tag, or label, can typically be about 40 mm square. The area 14 preferably constitutes an external capacitor, and a fusible link 16 is defined by an etched pattern on the metallised side of the tag. The fusible link 16 connects the external capacitor 14 with the areas 17 which preferably constitute an internal capacitor. The metallised areas 18 preferably constitute a coil. Slits 19 can be present in the positions indicated in order to reduce eddy current losses in the capacitor plates, which can typically be about 0.2 mm thick. In general, the slits of opposing capacitor plates preferably cross approximately at right angles, thereby minimizing capacitance errors. In general, such circuits are well known, and are therefore not discussed in any further detail herein.

Figure 5:
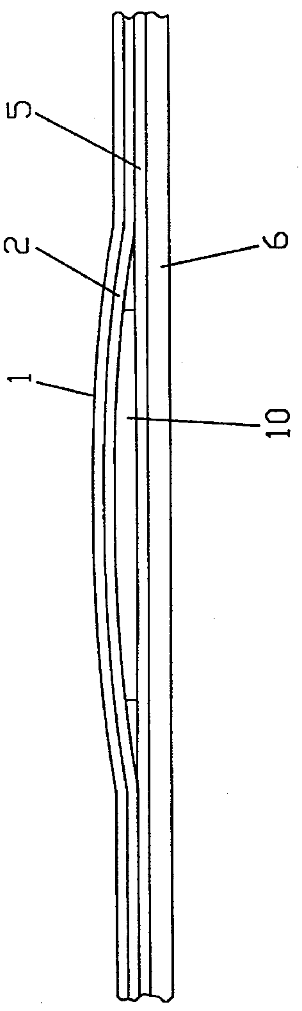
FIG. 5 shows, in cross section, a tag having the resonance circuit of FIG. 4.

FIG. 5 shows the resonance structure 10 of FIGS. 4A and 4B incorporated into a label structure in accordance with one embodiment of the present invention. As depicted, one possible embodiment of a label structure could have the the resonance structure 10 replacing the magnetic materials 3 and 4. The printing medium 6 can be coated on the resonance structure side of the label with the coating 5, to thereby make the resonance structure 10 essentially unable to be seen through the printing medium 6.

Figure 6:
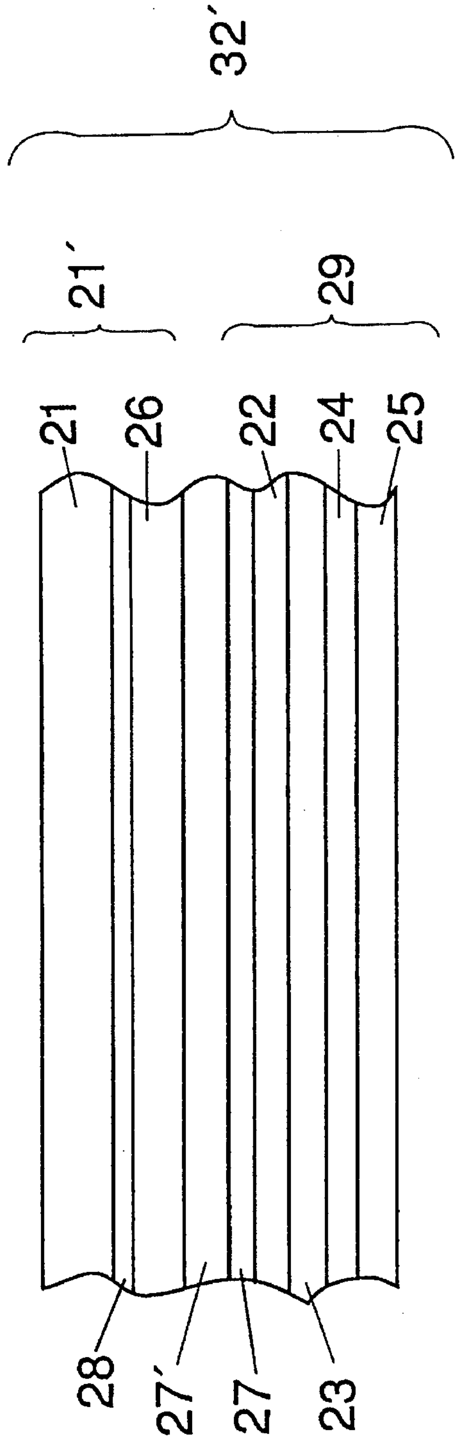
FIG. 6 is an alternative embodiment of an anti-theft tag.

FIG. 6 illustrates an additional embodiment of an anti-theft tag having a layer of magnetic material as the security element. FIG. 6 shows a tag, in cross section, which preferably has a printable recording medium 21. This printable recording medium 21 can be conventional label paper, which can be printed upon by means of an inked printing plate. Alternatively, this medium 21 could also be a temperature-sensitive thermal label paper which can be printed upon by means of a thermal printer head. The recording medium 21 can also be made of film, such as a mechanically-printed plastic, for which purpose, polypropylene has been found to be particularly well-suited.

This printable recording medium 21 can preferably be coated on its underside, or side disposed towards the rest of the layers of the label, with a low-transparency coating 28. Adjacent the coating 28, at least a strip of nickel 26 can preferably be applied. On top of the nickel film there can preferably be a polyester film 27', along with at least a strip of a sputtered, thin layer 27 of a soft magnetic material.

By means of an adhesive 22, preferably designed as a bonding emulsion with a strong adhesive force, the recording medium 21, with metal layers 26 and 27, can preferably be applied to an intermediate layer 23. This intermediate layer 23 can preferably be of a material which exerts a strong adhesive action on bonding emulsions. The intermediate layer 23, on the other side thereof, can preferably be glued to a carrier sheet, or foil 25 by means of a second adhesive 24, also preferably designed as a bonding emulsion, but with a relatively low adhesive strength.

As mentioned above, it is preferable that the intermediate layer 23 be made of a material which has a strong adhesion to the bonding emulsions. In this regard, the intermediate layer 23 can preferably be made from one of, or even a combination of, the following materials: glassine paper, high-gloss paper, polyethylene film or aluminum foil. Such materials, when used as the intermediate layer, generally exert a strong adhesive force on bonding emulsions.

The carrier sheet, or foil 25, which can preferably be a throw-away backing material to allow for transport and storage of the labels, is preferably coated, at least on the side facing the recording medium 21, with silicone. The silicone essentially exerts a weak adhesive force on bonding emulsions, thereby preferably enabling the carrier foil 25 to be easily pulled away from the intermediate layer 23. After removal of the carrier foil 25, the label can be attached to the products to be labelled by means of the exposed adhesive layer 24.

In an alternative embodiment, the carrier foil 25 can preferably be coated on both sides with silicone. By coating the carrier foil 25 on both surfaces with silicone, the manufacturer of labels according to the present invention can produce a primary laminated material, which can preferably serve as the base material for receiving a variety of printable materials thereon. To produce such an intermediate product, the intermediate layer 23 coated with adhesives 22 and 24 on opposite sides thereof, can preferably be deposited onto the carrier foil 25, which carrier foil 25 has preferably been treated with silicone on both surfaces thereof, with the adhesive 24 adjacent the carrier foil 25. The carrier foil 25 and intermediate layer 23 disposed thereon can then be rolled up into a roll, wherein the adhesive layer 22 will be brought into contact with the side of the carrier foil 25 facing away from the intermediate layer 23. Since the silicone layer, also located on the side of the carrier foil 25 facing away from the intermediate layer 23, preferably exerts a minimal adhesive action on the adhesive 22, the carrier foil 25 does not adhere to the intermediate layer 23 by means of the adhesive 22, and this intermediate product, or primary laminated material (having layers 22, 23, 24 and 25) can preferably be unrolled for attaching a printable medium 21, with an appropriate security element thereto.

In this manner, the manufacturer can produce a supply of intermediate product which can then be kept in stock. A consumer, after deciding what type of label material would be best suited for a desired purpose and what type of security element is preferred, could then have the manufacturer attach a suitable printing medium 21, with appropriate security layers 26, 27 to the intermediate product to form a finished label. Alternatively, the consumer might also be able to purchase machinery for attaching a printing medium 21 and appropriate security elements 26, 27 to the intermediate product, to thereby make their own customized labels at the consumers end.

Before the label, having components 21 through 28 according to at least one embodiment of the present invention can be applied to a product, the carrier foil 25 can preferably be pulled away by virtue of the silicone on the carrier foil 25. If the label applied to the product is then to be removed from the product, since the intermediate layer 23 exerts a much stronger adhesive force on the adhesive 24 than the product exerts on the adhesive 24, essentially all of the adhesive 24 will remain adhering to the intermediate layer 23, and substantially no adhesive residue will be left on the product. Under the best conditions, essentially all of the adhesive will remain adhering to the intermediate layer 23, and no adhesive will remain on the product. In spite of the minimal adhesive force between sputtered layers and adhesive, the intermediate layer 23 can preferably remain adhering to the sputtered layer 27, since the adhesive 22 is one with a strong adhesion for that purpose.

If a product labelled with the anti-theft label illustrated in FIG. 6 is stolen and carried through a gate-type detector having a transmitter and receiver coil, the label would essentially be irradiated by the transmitter coil with an alternating electromagnetic field which can cause the soft-magnetic sputter film 27 to be remagnetized at the frequency of the alternating field. This remagnetization can thereby cause the film 27 to emit an alternating electromagnetic field. If such a field is received by the receiver coil, the theft alarm can be set off. If the item is paid for, the nickel film 26, which has hard magnetic properties, can be magnetized by means of a strong magnet so that the nickel film 26 drives the soft magnetic sputter film 27 to magnetic saturation. Thus, the sputter film 27 can essentially no longer react to alternating electromagnetic fields as described above, i.e. the sputter film 27 is deactivated. The products with the deactivated anti-theft label can then essentially be carried through the detector without setting off an alarm.

Figure 7:
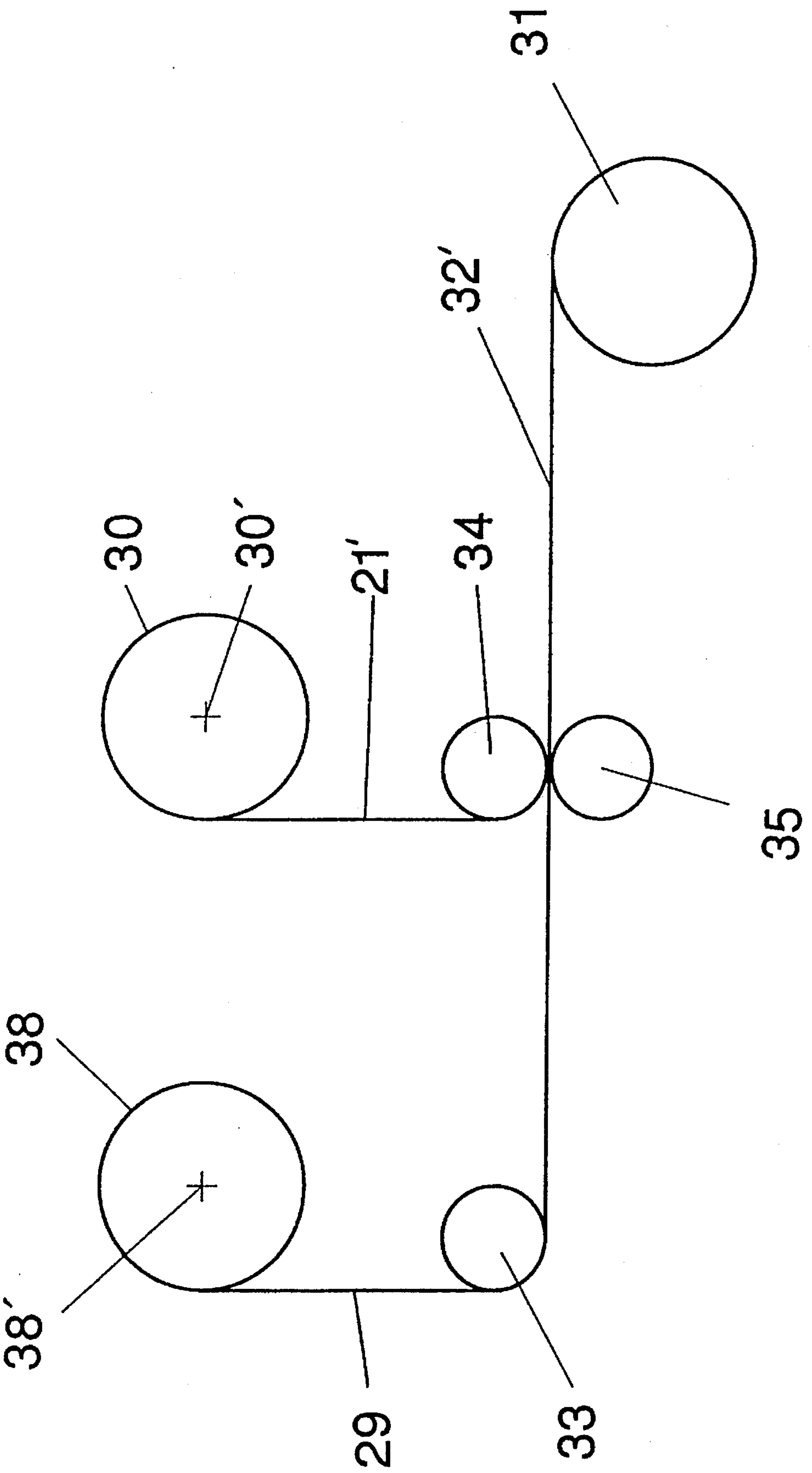
FIG. 7 depicts one type of apparatus for making one embodiment of an anti-theft tag in accordance with the present invention.

An apparatus to further illustrate the manufacture of labels of the types described above is schematically illustrated in FIG. 7. Such apparatus can preferably have a first payoff roll 38, on which the primary material (22, 23, 24, 25) can preferably be disposed. It is preferable that primary material (22, 23, 24, 25) be wound so that the adhesive layer 22 comes into contact with the side of the intermediate layer 23 which faces the axis of rotation 38' of the first payoff roll 38. The apparatus can also preferably have a second payoff roll 30, about which the printable recording medium 21 can be wound. As discussed previously, the printable recording medium may also have an additional nickel film 26 and a polyester film 27' with a sputter film 27, which additional layer generally forms the electromagnetically active portion 21' of an anti-theft label. This printable recording medium 21', can preferably be wound on the second payoff roll 30 so that the sputter film 27 is on the side of the medium 21 facing away from the axis of rotation 30' of the second payoff roll 30. Further, the apparatus can also have a takeup roll 31, on which the product 32', illustrated in cross section in FIG. 6, can be rolled up, so that the label material can be transported for further processing, e.g. to a label press, or other appropriate device, wherein an imprint can be printed on the printable recording medium 21.

In manufacturing the assembled labels, the primary laminated material 29 can preferably be unrolled from the first payoff roll 38, and transported by means of a first deflector roller 33 to a roller pair 34, 35. Substantially simultaneously, the recording medium 21' can be unrolled from the second payoff roller 30 to the roller pair 34, 35. The rollers 34 and 35 are preferably disposed with roll axes which are parallel to one another and perpendicular to the direction of travel of the primary laminated material 29. At the roller pair 34, 35, the recording medium 21' is preferably pressed onto the primary laminated material 29, whereby the recording medium 21', or, alternatively, the sputter film 27 of the electromagnetically active part 21', is preferably glued by means of the adhesive layer 22 to the primary laminated material 29. The resulting assembled product 32' can then be wound up on the takeup roll 31, and can be transported to a label press for further processing of the intermediate product, i.e. the printing of information on the recording medium 21.

One feature of the invention resides broadly in an anti-theft tag, having a backing film 2 for an electromagnetic security element and of a recording medium 6 glued to the security element, characterized by the fact that the recording medium 6, on the side facing the security element, is provided with a coating 5 which has a low transparency for light waves in the visible range such that the security element is not visible.

Another feature of the invention resides broadly in the anti-theft tag characterized by the fact that the coating 5 of low transparency is an opaque coat of ink or paint.

Yet another feature of the invention resides broadly in the anti-theft tag characterized by the fact that a coating of low transparency is applied to the backing film 2.

Still another feature of the invention resides broadly in the anti-theft tag characterized by the fact that there is a backing strip 1, to which the backing film 2 is detachably glued by means of its side facing away from the security element.

A further feature of the invention resides broadly in the anti-theft tag characterized by the fact that the security element is a continuous, magnetically soft metal strip 4.

Another feature of the invention resides broadly in the anti-theft tag characterized by the fact that the metal strip 4 is covered by magnetically hard pieces of metal strip 3 located at intervals from one another.

Yet another feature of the invention resides broadly in the anti-theft tag characterized by the fact that the low-transparency coating 5 and/or the coating applied to the backing film consists of diamagnetic or paramagnetic metal.

Still another feature of the invention resides broadly in the anti-theft tag characterized by the fact that the metal is aluminum.

A further feature of the invention resides broadly in the anti-theft tag characterized by the fact that the security element is designed as a magnetically soft thin film coating applied to the backing film 2.

Another feature of the invention resides broadly in the anti-theft tag characterized by the fact that there is a magnetically hard metal film located over and/or under the magnetically soft thin film coating.

Yet another feature of the invention resides broadly in the anti-theft tag characterized by the fact that the metal film consists of nickel.

Still another feature of the invention resides broadly in the anti-theft tag characterized by the fact that the security element is a resonant circuit.

A further feature of the invention resides broadly in the anti-theft tag characterized by the fact that the recording medium 6 is a material similar to cardboard.

One type of intermediate layer 23, which could be used in accordance with one embodiment of the present invention is the material "HERMA-Doppelklebeband 12N/32 T" which is manufactured by HERMA Heinrich Hermann GmbH & Co., Filderstadt, Germany. This material is a glassine paper with a thickness of about 56 micrometers and has a weight of about 55 $g/m^2$.

Some types of anti-theft labels made from magnetized, or magnetizable materials, which could possibly be made in accordance with the present invention, are disclosed by the following U.S. Pat. Nos.: U.S. Pat. No. 4,799,045 to Fearon and Fearon, entitled "Method of Detecting a Label Used in an Anti-Theft Surveillance System"; U.S. Pat. No. 4,652,863 to Hultman, entitled "Disarmable Magnetic Anti-Shoplifting Marker"; and U.S. Pat. No. 4,527,152 to Scarr and Fearon, entitled "Anti-Shoplifting System".

German Patent Publication Application No. P 43 00 411, having inventors Volker Bausewein and Dieter Ludebühl, and the following published patent applications to Andrew Dames: Great Britain published Patent Application No. GB9114793; PCT/GB/01250; and International Publication No. WO93/01571, are hereby incorporated by reference as id set forth in their entirety herein.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 23 883.1, filed on Jul. 16, 1993, having inventor Dieter Ludebühl, and DE-OS P 43 23 883.1 and DE-PS P 43 23 883.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A combination method of making a display marking tag, and marking an item by means of the display marking tag, the display marking tag being configured to be adhesively attached to the item, the display marking tag comprising: a first sheet of material, said first sheet of material having a first side, and a second side disposed opposite said first side; a first adhesive disposed on at least a portion of said first side of said first sheet of material, said first adhesive being configured for retaining said tag on the item to be marked; means for being sensed disposed immediately adjacent said second side of said first sheet of material; a second sheet of material, said second sheet of material having a translucency to visible light; a second adhesive disposed on at least a portion of said second side of said first sheet of material; and said second sheet of material comprising: a first side configured for the display of information thereon; and a second side disposed in at least partial contact with said second adhesive to retain said first sheet of material in at least partial contact with said second sheet of material and sandwich said means for being sensed between said first and second sheets of material, said second side comprising: a layer of material substantially opaque to visible light for decreasing the translucency of said second sheet of material to visible light; said opaque layer comprising means for substantially concealing said means for being sensed from being visibly detected from said first side of said second sheet of material, said method comprising the steps of:

making said marking tag by way of the following steps:
- providing said first sheet of material;
- providing said first adhesive for said first side of said first sheet of material, said providing comprising configuring said first adhesive to have a degree of adhesion for adhering the marking tag to an item;
- providing said first adhesive on at least a portion of said first side of said first sheet of material;
- providing a removable backing strip having a coating with minimal adhesion to at least said first adhesive to maintain said removable backing strip in contact with said first sheet of material prior to attaching said tag to an item, and to enable said backing strip to be removed from said first sheet of material for application of said tag to an item;
- applying said removable backing strip to said first side of said first sheet of material;
- providing said second sheet of material, said second sheet of material having a translucency to visible light;

decreasing the translucency of said second sheet of material to visible light by providing said second side of said second sheet of material with said layer of material substantially opaque to visible light and by providing said means for concealing;

providing said second adhesive for said second side of said first sheet of material to adhere said first sheet of material to said second sheet of material, said providing comprising configuring said second adhesive to provide a substantially stronger degree of adhesion between said first sheet of material and said second sheet of material than the degree of adhesion provided by said first adhesive between said first sheet of material and an item to which said tag is to be attached;

providing said second adhesive on at least a portion of said second side of said first sheet of material;

providing said means for being sensed and disposing said means for being sensed between said first and second sheets of material;

attaching said second sheet of material to said first sheet of material via said second adhesive; and for marking an item, said method further comprising the steps of:

removing the removable backing from said first adhesive on said first side of said first sheet of material of said marking tag; and marking an item by attaching said first side of said first sheet of material to the item to be marked with said first side of said second sheet of material disposed away from the item, and concealing, with said means for concealing, said means for being sensed from being visibly detected from said first side of said second sheet of material.

2. The method according to claim 1, further comprising:

additionally providing a layer of said substantially opaque material on said first sheet of material, said substantially opaque layer of said first sheet of material having means for concealing said means for being sensed from being visibly detected from said first side of said first sheet of material;

configuring said first sheet of material to have a greater adhesion for at least said first adhesive than said first adhesive has to an item to be marked; and providing a security element for said means for being sensed.

3. The method according to claim 2, further including:

forming said means for concealing of said first and second sheets of material from at least one of:

ink, paint, diamagnetic metal and paramagnetic metal;

configuring said security element from a magnetically soft metal disposed between said first and second sheets of material; and disposing magnetically hard metal between said first and second sheets of material in conjunction with said magnetically soft metal.

4. The method according to claim 3, further including the steps of:

configuring said magnetically soft metal as at least one of:

a magnetically soft metal strip; and a film coating of magnetically soft metal applied to said second side of said first sheet of material;

configuring said magnetically hard metal as at least one of:

pieces of magnetically hard metal strips spaced apart at intervals from one another; and a magnetically hard metal film applied onto said coating of magnetically soft metal applied to said second side of said first sheet of material.

5. The method according to claim 4, further comprising the steps of:

providing nickel as said magnetically hard metal;

providing aluminum as said diamagnetic metal and paramagnetic metal;

providing, as said second sheet of material, at least one of:

conventional paper;

temperature sensitive printing paper; and paper having a rigidity sufficient for inhibiting feeling by touch of said security element disposed between said first and second sheets of material;

providing a polyester coated with aluminum as said first sheet of material; and providing grey ink as said ink.

6. A display marking tag for marking an item to which the tag will be attached, said tag comprising:

a first sheet of material, said first sheet of material having a first side, and a second side disposed opposite said first side;

a first adhesive disposed on at least a portion of said first side of said first sheet of material, said first adhesive being configured for retaining said tag on the item to which said tag will be attached;

means for being sensed, said means for being sensed being disposed immediately adjacent said second side of said first sheet of material;

a second sheet of material, said second sheet of material having a translucency to visible light;

a second adhesive disposed on at least a portion of said second side of said first sheet of material, said second adhesive being configured for having a greater degree of adhesion between said first sheet of material and said second sheet of material than a degree of adhesion provided by said first adhesive between said first sheet of material and an item to which said tag will be attached; and said second sheet of material comprising:

a first side, said first side of said second sheet of material being configured for the display of information thereon; and a second side, said second side of said second sheet of material being disposed in at least partial contact with said second adhesive to retain said first sheet of material in at least partial contact with said second sheet of material and sandwich said means for being sensed between said first and second sheets of material, said second side comprising:

a layer for decreasing the translucency of said second sheet of material to visible light, said layer being semitransparent; and said layer comprising means for concealing said means for being sensed from being visibly detected from said first side of said second sheet of material.

7. The tag according to claim 6, further including:

said means for being sensed comprising an electromagnetic security element configured for emitting an electromagnetic field when subjected to an electromagnetic field; and said means for concealing comprising a substantially opaque material, said substantially opaque material concealing said means for being sensed from being visibly detected from said first side of said first sheet of material.

8. The tag according to claim 6 wherein said means for concealing comprises a substantially opaque material, said substantially opaque material concealing said means for being sensed from being visibly detected from said first side of said second sheet of material.

9. The tag according to claim 8, wherein:

said first sheet of material additionally comprises a layer of said substantially opaque material for concealing said means for being sensed from being visibly detected from said first side of said first sheet of material;

said substantially opaque materials of said first and second sheets of material each comprise at least one of: ink, paint, diamagnetic metal and paramagnetic metal;

said means for being sensed comprises a security element, said security element comprising a magnetically soft metal disposed between said first and second sheets of material; and said security element further comprises magnetically hard metal disposed between said first and second sheets of material in conjunction with said magnetically soft metal.

10. The tag according to claim 9, wherein:

said magnetically soft metal comprises at least one of:
a magnetically soft metal strip; and
a film coating of magnetically soft metal applied to said second side of said first sheet of material;

said magnetically hard metal comprises at least one of:
pieces of magnetically hard metal strips spaced apart at intervals from one another; and
a magnetically hard metal film applied onto said coating of magnetically soft metal applied to said second side of said first sheet of material.

11. The tag according to claim 10, wherein:

said magnetically hard metal comprises nickel;

said diamagnetic metal and paramagnetic metal comprise aluminum;

said second sheet of material comprises at least one of:
conventional paper;
temperature sensitive printing paper; and
paper having a rigidity sufficient for inhibiting feeling by touch of said security element disposed between said first and second sheets of material;

said first sheet of material comprises polyester coated with aluminum; and said ink comprising grey ink.

12. A display marking tag for being attached to an item, said tag comprising:

a first sheet of material, said first sheet of material having a translucency to visible light, and said first sheet of material comprising:
a first side, said first side comprising means for display of information thereon; and
a second side, said second side being opposite to said first side;

means for attaching said tag to the item, said means for attaching being disposed at said second side of said first sheet of material;

means for being sensed, said means for being sensed for being disposed at said second side of said first sheet of material;

means for maintaining said means for being sensed at said second side of said first sheet of material; and said second side of said first sheet of material comprising:
a layer configured for decreasing the translucency of said first sheet of material, said layer being semi-transparent;
said layer comprising means for concealing said means for being sensed from visible detection through said first sheet of material from said first side of said first sheet of material.

13. The tag according to claim 12 wherein said tag comprises an anti-theft tag for being applied to an item to minimize unauthorized removal of the item from an area, said area having means for detecting said means for being sensed, and further wherein:

said means for concealing comprises a substantially opaque material, said substantially opaque material concealing said means for being sensed from being visibly detected from said first side of said first sheet of material.

14. The tag according to claim 13, further comprising:

a second sheet of material disposed adjacent said second side of said first sheet of material, said second sheet of material having a first side for being disposed in at least partial contact with said second side of said first sheet of material, and a second side for being disposed towards the item to be marked;

a first adhesive disposed between said second side of said first sheet of material and said first side of said second sheet of material to permanently hold said first and second sheets of material in contact with one another, said first adhesive comprising said means for maintaining said means for being sensed at said second side of said first sheet of material; and said means for being sensed being disposed between said first and second sheets of material.

15. The tag according to claim 14, wherein:

said substantially opaque material comprises at least one of:

ink, paint, diamagnetic metal and paramagnetic metal;

said security element comprises a magnetically soft metal disposed between said first and second sheets of material; and said security element further comprises magnetically hard metal disposed between said first and second sheets of material in conjunction with said magnetically soft metal.

16. The tag according to claim 15, wherein:

said magnetically soft metal comprises at least one of:
a magnetically soft metal strip; and
a film coating of magnetically soft metal applied to said first side of said second sheet of material;

said magnetically hard metal comprises at least one of:
pieces of magnetically hard metal strips spaced apart at intervals from one another;
a magnetically hard metal film applied to said first side of said second sheet of material prior to said coating of magnetically soft metal; and
a magnetically hard metal film applied onto said coating of magnetically soft metal applied to said first side of said second sheet of material.

17. The tag according to claim 16, wherein:

said magnetically hard metal comprises nickel;

said diamagnetic metal and paramagnetic metal comprise aluminum; and said second sheet of material additionally comprises a layer of said substantially opaque material for concealing said means for being sensed from being visibly detected from said second side of said second sheet of material.

18. The tag according to claim 17, wherein:

said second side of said second sheet of material comprises a second adhesive thereon for affixing said tag to the item to be protected, said second adhesive comprising said means for attaching;

said tag further comprises a third backing strip detachably glued to said second side of said second sheet of material by said second adhesive, said backing strip comprising a coating of silicone thereon, said silicone coating having minimal adhesion to at least said second adhesive for removing said backing strip from said tag;

said first sheet of material comprises at least one of:

conventional paper;

temperature sensitive printing paper; and paper having a rigidity sufficient for inhibiting feeling of said security element disposed between said first and second sheets of material;

said second sheet of material comprises polyester coated with aluminum; and said ink comprising grey ink.

19. The tag according to claim 14, wherein:

said substantially opaque material comprises at least one of:

ink, paint, diamagnetic metal and paramagnetic metal;

said means for being sensed comprises an electromagnetic security element; and said electromagnetic security element comprises a resonant circuit disposed between said first and second sheets of material.

20. The tag according to claim 19, wherein:

said diamagnetic metal and paramagnetic metal comprise aluminum;

said second sheet of material additionally comprises a layer of said substantially opaque material;

said second side of said second sheet of material comprises a second adhesive thereon for affixing said tag to the item to be protected, said second adhesive comprising said means for attaching;

said tag further comprises a third backing strip detachably glued to said second side of said second sheet of material by said second adhesive, said backing strip comprising a coating of silicone thereon, said silicone coating having minimal adhesion to at least said second adhesive for removing said backing strip from said tag;

said first material comprises at least one of:

conventional paper;

temperature sensitive printing paper; and paper having a rigidity sufficient for inhibiting feeling of said security element disposed between said first and second sheets of material;

said second sheet of material comprises polyester coated with aluminum; and said ink comprising grey ink.

21. The method according to claim 2 further comprising:

providing an electromagnetic security element for said security element; and configuring said electromagnetic security element for emitting an electromagnetic field when subjected to an electromagnetic field.

* * * * *